United States Patent
Nomura et al.

(10) Patent No.: US 6,757,489 B2
(45) Date of Patent: Jun. 29, 2004

(54) ZOOM LENS OF A CAMERA (75) Inventors: Hiroshi Nomura, Saitama (JP);
Kazuyoshi Azegami, Tokyo (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/188,968

(22) Filed: Jul. 5, 2002

(65) Prior Publication Data

US 2003/0007796 A1 Jan. 9, 2003

(30) Foreign Application Priority Data

Jul. 6, 2001 (JP) ......................................... 2001-206749

(51) Int. Cl.[7] .......................... G03B 17/00; G03B 17/04

(52) U.S. Cl. ............................. 396/72; 396/85; 396/349

(58) Field of Search .............................. 396/72, 73, 85, 396/349; 359/694

(56) References Cited

U.S. PATENT DOCUMENTS

| | | | |
|---|---|---|---|
| 5,450,242 A | | 9/1995 | Kohmoto et al. |
| 5,809,348 A | * | 9/1998 | Nomura et al. ............... 396/72 |
| 6,023,376 A | | 2/2000 | Nomura et al. |

* cited by examiner

*Primary Examiner*—Russell Adams
*Assistant Examiner*—Arthur A Smith
(74) *Attorney, Agent, or Firm*—Greenblum & Bernstein, P.L.C.

(57) ABSTRACT

A lens barrel includes a first ring member having a ring frame portion and at least one leg portion which extends from the ring frame portion in an optical axis direction; and a second ring member, which is relatively movable in the optical axis direction with respect to the first ring member, the second ring member having at least one slot which extends in the optical axis direction, the leg portion being inserted into the slot so that the leg portion can move in the optical axis direction along the slot. The second ring member is coupled to the first ring member so that the second ring member is positioned substantially within a radial thickness of the leg portion.

13 Claims, 6 Drawing Sheets

Fig. 1

Fig. 2 ably fits within the thickness, in a radial direction, defined the slot of the linear guide ring with respect to a sectional plane parallel to the optical axis.

ZOOM LENS OF A CAMERA

BACKGROUND OF THE INVENTION

1. Field of the Invention

The present invention relates to a zoom lens which can be used as a photographing zoom lens of a compact camera.

2. Description of the Related Art

Among internal-zooming type zoom lenses of compact cameras in which a zooming operation is performed by moving one or more intermediate lens groups while maintaining the distance between the frontmost lens group and the rearmost lens group, zoom lenses in which the space between the frontmost lens group and the rearmost lens group is reduced immediately after the power of the camera is turned OFF are known in the art. In such conventional zoom lenses, the lens support ring which supports the rearmost lens group generally has a fundamental cylindrical shape and is provided with slots or cutout portions to guide the lens support ring itself or one or more lens groups positioned in the lens support ring in a direction, e.g., in the optical axis direction of the zoom lens.

Such a lens support ring has become the cause of difficultly in achieving a further reduction in size and weight of the photographing optical system of the zoom lens.

SUMMARY OF THE INVENTION

The present invention has been devised in view of the problem noted above, and accordingly, the present invention provides a zoom lens having a structure which can achieve a compact and light-weight zoom compact camera and facilitates the assembling of the photographing optical system of the zoom lens.

For example, a lens barrel is provided, including a first ring member having a ring frame portion and at least one leg portion which extends from the ring frame portion in an optical axis direction; and a second ring member, which is relatively movable in the optical axis direction with respect to the first ring member, the second ring member having at least one slot which extends in the optical axis direction, the leg portion being inserted into the slot so that the leg portion can move in the optical axis direction along the slot. The second ring member is coupled to the first ring member so that the second ring member is positioned substantially within a radial thickness of the leg portion.

It is desirable for a radially outer surface of the leg portion to be substantially flush with an outer peripheral surface of the second ring member.

It is desirable for a radially inner surface of the leg portion is substantially flush with an inner peripheral surface of the second ring member.

In another embodiment, a zoom lens is provided, having a frontmost movable lens group, at least one intermediate movable lens group and a rearmost movable lens group, in that order from the front of the zoom lens, the zoom lens including a lens support ring which supports the frontmost movable lens group; a linear guide ring positioned in the lens support ring to be movable along the optical axis; and a rearmost lens group support ring which supports the rearmost movable lens group, the rearmost lens group support ring being positioned in the lens support ring to move along the optical axis while varying a distance between the rearmost movable lens group support ring and the frontmost movable lens group. The rearmost lens group support ring includes at least one leg portion which extends parallel to the optical axis. The linear guide ring includes at least one slot which extends parallel to the optical axis, the leg portion being inserted into the slot so that the leg portion can move in the optical axis direction along the slot. The leg portion substantially fits within the thickness, in a radial direction, defined the slot of the linear guide ring with respect to a sectional plane parallel to the optical axis.

The leg portion can include an engaging portion which comes into contact with the lens support ring to prevent the lens support ring from moving along the optical axis relative to the rearmost lens group support ring to thereby maintain the distance between the frontmost movable lens group and the rearmost movable lens group.

It is desirable for a portion of the linear guide ring on which the slot is formed to be positioned in the lens support ring. The leg portion is inserted into the slot to be slidable in the optical axis direction so that the rearmost movable lens group is movable in the optical axis direction without rotating about the optical axis relative to the linear guide ring.

It is desirable for the linear guide ring to include at least one bridge portion which extends under a portion of the slot from inside of the linear guide ring. The bridge portion is in contact with the leg portion over a full width range thereof to prevent the leg portion from slipping into the inside of the linear guide ring.

It is desirable for the leg portion to include first support portions formed on opposite side edges of the leg portion, respectively, and for the linear guide ring to include second support portions formed on respective sides of the slot, wherein the first support portions are in sliding contact with the second support portions so as to prevent the leg portion from slipping into the inside of the linear guide ring.

The zoom lens can be a multi-stage-extension zoom lens barrel having a plurality of sub-barrels arranged concentrically about the optical axis, the distance between the frontmost movable lens group and the rearmost movable lens group being reduced when the plurality of sub-barrels are fully retracted.

The leg portion can include a resilient narrow portion extending parallel to the optical axis, a front end of the resilient narrow portion being formed integral with the leg portion so that a rear end of the resilient narrow portion serves as a free end. The engaging portion can be formed at the rear end of the resilient narrow portion and extends radially outwards.

It is desirable for each of the first support portions to include a tongue portion, and each of the second support portion to include a half groove portion on which the tongue portions is slidably positioned.

The zoom lens can further include a lens shutter unit positioned between the frontmost movable lens group and the rearmost movable lens group and around the intermediate movable lens group.

The present disclosure relates to subject matter contained in Japanese Patent Application No. 2001-206749 (filed on Jul. 6, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
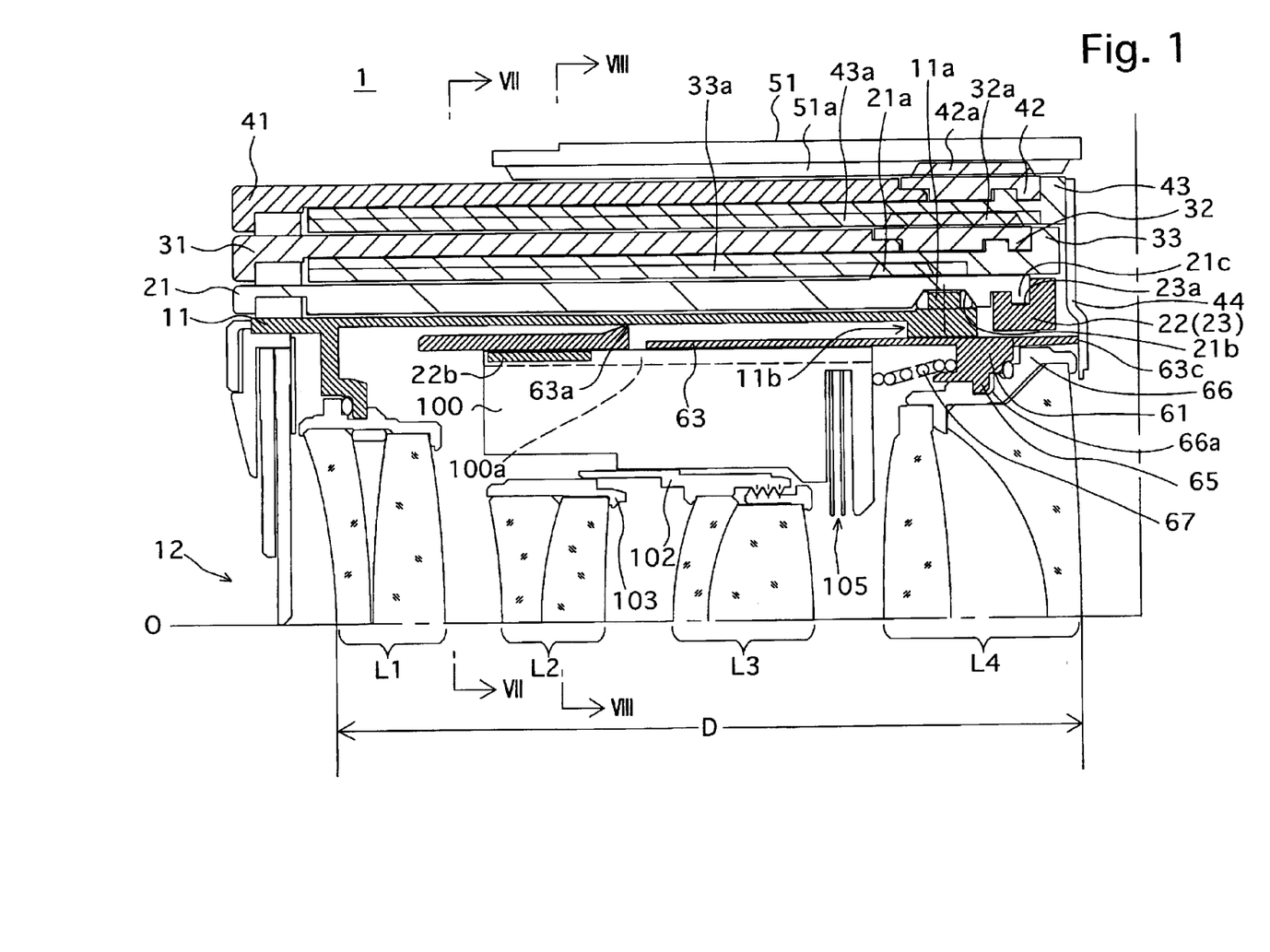
FIG. 1 is an axial cross sectional view of an embodiment of a 4-stage-extension zoom lens having four lens groups of a compact camera, according to the present invention, showing the 4-stage-extension zoom lens above the optical axis thereof in a fully retracted state.
Figure 2:
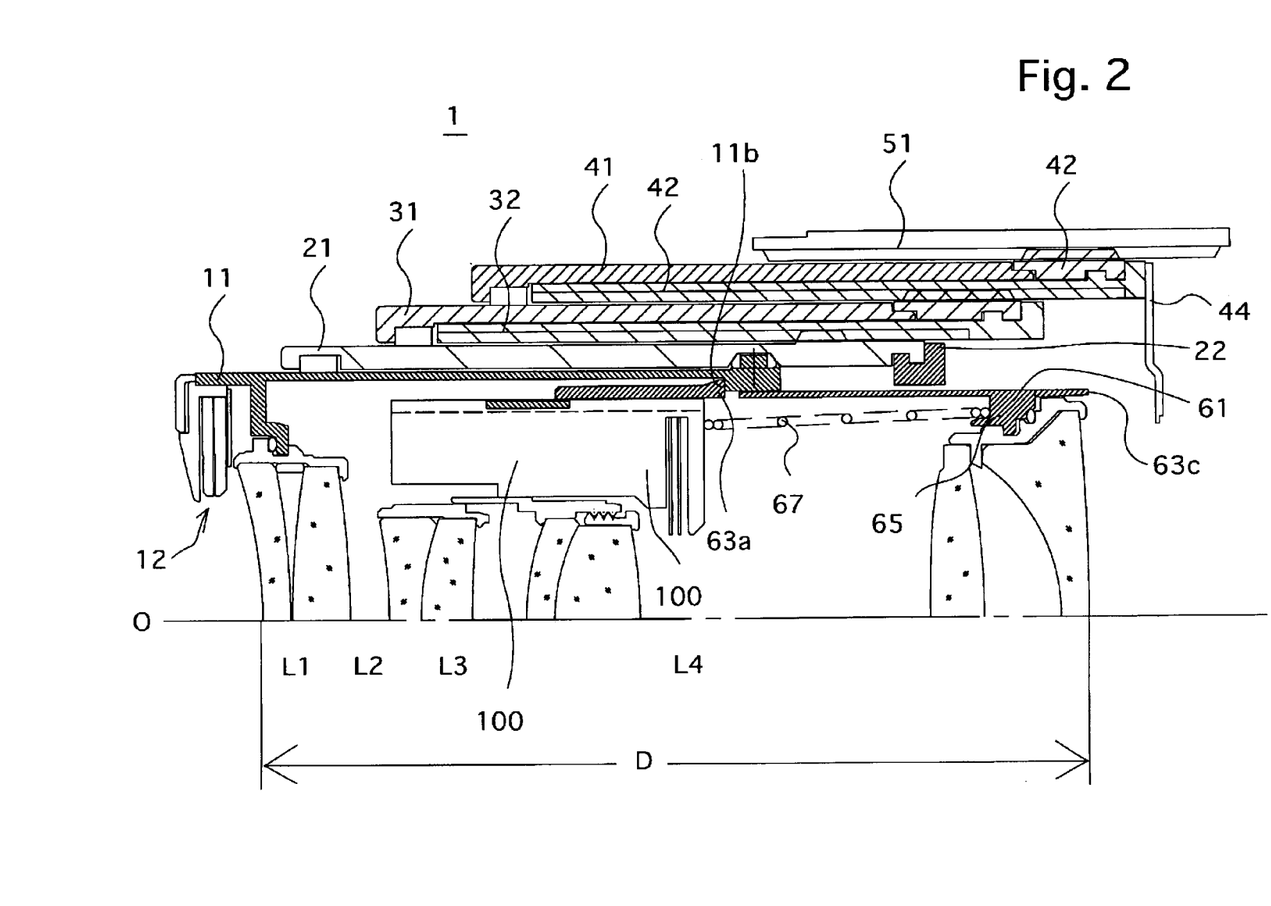
FIG. 2 is a view similar to that of FIG. 1, showing the zoom lens above the optical axis thereof when the focal length is set to the wide-angle extremity.
Figure 3:
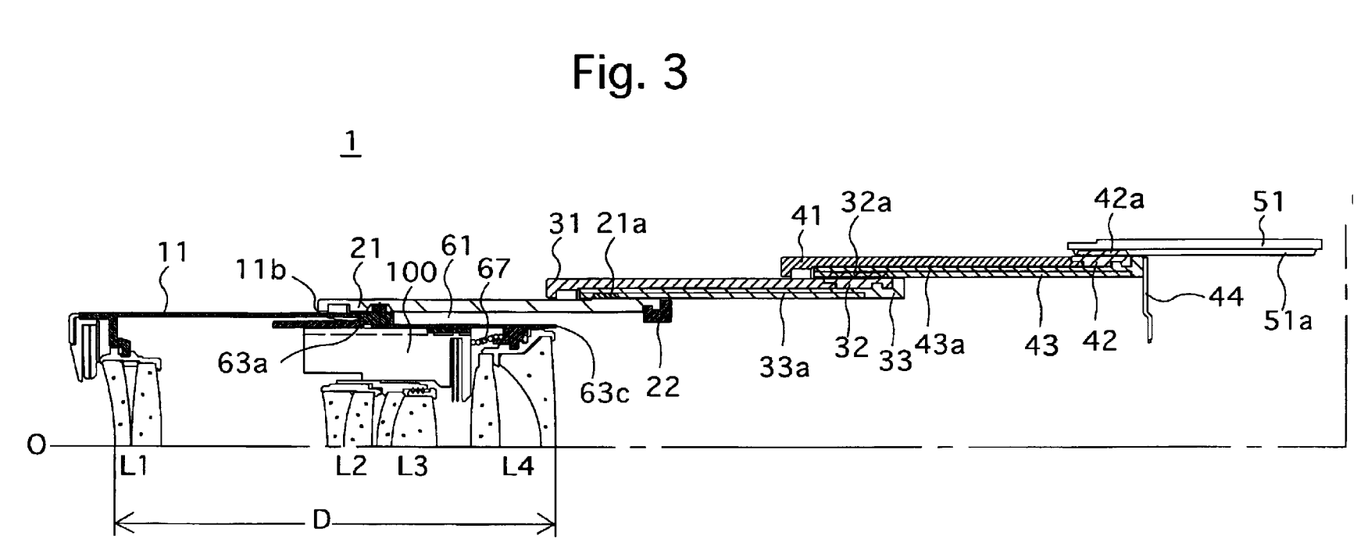
FIG. 3 is a view similar to that of FIG. 1, showing the 4-stage-extension zoom lens above the optical axis thereof when the focal length is set to the telephoto extremity.

FIGS. 1 through 3 show an embodiment of a 4-stage-extension zoom lens (multi-stage-extension zoom lens barrel) of a compact camera according to the present invention. The 4-stage-extension zoom lens 1 is provided with a photographing optical system having four lens groups: a first lens group (frontmost movable lens group) L1, a second lens group (intermediate movable lens group) L2, a third lens group (intermediate movable lens group) L3 and a fourth lens group (rearmost movable lens group) L4, in that order from the object side (the left side as viewed in FIG. 1). The 4-stage-extension zoom lens 1 is an internal-zooming type. Namely, in a zooming operation, the first and fourth lens groups L1 and L4 move along an optical axis O while the distance therebetween maintains the same length. During this zooming operation, the second lens group L2 moves along the optical axis O while varying the distance between the second lens group L2 and the first lens group L1, and the third lens group L3 moves along the optical axis O while varying the distance between the third lens group L3 and the fourth lens group L4.

The 4-stage-extension zoom lens 1 is provided with a first sub-barrel (lens support ring/innermost sub-barrel) 11, a second sub-barrel (a cam ring) 21, a third sub-barrel 31, a fourth sub-barrel (an outermost sub-barrel) 41 and a stationary barrel 51, in that order in a direction radially outwards from the optical axis O. The first sub-barrel 11 moves linearly along the optical axis relative to the second sub-barrel 21 and relatively rotates about the optical axis O with respect to the sub-barrel 21 (i.e., the sub-barrel 21 rotates) without rotating about the optical axis O relative to the stationary barrel 51. The second, third and fourth sub-barrels 21, 31 and 41 move along the optical axis O relative to one another while rotating together about the optical axis O. The first lens group L1 is supported by the first sub-barrel 11 therein in the vicinity of the front end of the first sub-barrel 11. The second and third lens groups L2 and L3 are supported by the second sub-barrel 21 therein. Each of the first through fourth sub-barrels and the stationary barrel 11, 21, 31, 41 and 51 is generally made of synthetic resin, and is formed by injection molding.

The stationary barrel 51 is fixed to a camera body (not shown), or is formed integral with a frame of the camera body. The stationary barrel 51 is provided on an inner peripheral surface thereof with a female helicoidal thread 51a. The first through fourth sub-barrels 11, 21, 31 and 41 are supported by the stationary barrel 51 therein so that the second, third and fourth sub-barrels 21, 31 and 41 advance from and retract into the stationary barrel 51 along the optical axis O. The structures of the fourth sub-barrel 41, the third sub-barrel 31, the second sub-barrel 21 and the first sub-barrel 11 will be hereinafter discussed in that order.

[The Structure of the Fourth Sub-barrel]

The fourth sub-barrel 41 is provided at the rear end thereof with a male helicoid ring 42 which is fixed to the fourth sub-barrel 41 to be rotatable about the optical axis O together with the fourth sub-barrel 41 and to be movable along the optical axis O together with the fourth sub-barrel 41. The male helicoid ring 42 is provided on an outer peripheral surface thereof with a male helicoidal thread 42a which is in mesh with the female helicoidal thread 51a of the stationary barrel 51. An outer linear guide ring 43 is fitted in both the fourth sub-barrel 41 and the male helicoid ring 42 to be rotatable about the optical axis O relative to the fourth sub-barrel 41 and the male helicoid ring 42 and to be movable along the optical axis O together with the fourth sub-barrel 41 and the male helicoid ring 42. A lens stop plate 44 is fixed to a rear end face of the outer linear guide ring 43. The stationary barrel 51 is provided on an inner peripheral surface thereof with a set of guide grooves (not shown) which extend parallel to the optical axis O, and the outer linear guide ring 43 is provided with a set of guide followers (not shown) which extend radially outwards to be slidably engaged in the set of guide grooves of the stationary barrel 51, respectively. Accordingly, the outer linear guide ring 43 is fitted in the stationary barrel 51 to be movable along the optical axis O without rotating about the optical axis O relative to the stationary barrel 51 due to the engagement of the set of followers with the set of guide grooves.

The fourth sub-barrel 41 is driven to rotate about the optical axis O relative to the stationary barrel 51 by a zoom motor (not shown) provided in the camera body when a zooming operation is carried out or when the first through fourth sub-barrels 41 retreat into the stationary barrel 51. For instance, the male helicoid ring 42 is provided on an outer peripheral surface thereof across the male helicoidal thread 42a with a circumferential gear portion which extends in a circumferential direction about the optical axis O, and a pinion gear which is elongated in a direction of the optical axis O, i.e., the optical axis direction, is in mesh with the circumferential gear portion. The elongated pinion gear is driven by the aforementioned zoom motor via a reduction gear train. Accordingly, rotation of the zoom motor in the forward and reverse directions causes the male helicoid ring 42 to rotate forwardly and reversely, thus causing the fourth sub-barrel 41 to advance and retreat while rotating due to the engagement of the male helicoidal thread 42a with the female helicoidal thread 51a.

[The Structure of the Third Sub-barrel]

The third sub-barrel 31 is provided at the rear end thereof with a male helicoid ring 32 which is fixed to the third sub-barrel 31 to be rotatable about the optical axis O together with the third sub-barrel 31 and to be movable along the optical axis O together with the third sub-barrel 31. The male helicoid ring 32 is provided on an outer peripheral surface thereof with a male helicoidal thread 32a which is in mesh with a female helicoidal thread 43a formed on an inner peripheral surface of the outer linear guide ring 43.

A middle linear guide ring 33 is fitted in the third sub-barrel 31 and the male helicoid ring 32 to be rotatable about the optical axis O relative to the third sub-barrel 31 and the male helicoid ring 32 and to be movable along the optical axis O together with the third sub-barrel 31 and the male helicoid ring 32.

The outer linear guide ring 43 is provided on an inner peripheral surface thereof with a set of guide grooves (not shown) which extend parallel to the optical axis O, and the middle linear guide ring 33 is provided with a set of guide followers (not shown) which extend radially outwards to be slidably engaged in the set of guide grooves of the outer linear guide ring 43, respectively. Accordingly, the middle linear guide ring 33 is fitted in the outer linear guide ring 43 to be movable along the optical axis O without rotating about the optical axis O relative to the outer linear guide ring 43 due to the engagement of the set of guide followers with the set of guide grooves.

The fourth sub-barrel 41 is provided on an inner peripheral surface thereof with a set of linear guide grooves (not shown) which extend parallel to the optical axis O, and the male helicoid ring 32 is provided on an outer peripheral surface thereof with a set of linear guide followers (not shown) which are respectively engaged in the set of linear guide grooves of the fourth sub-barrel 41. The outer linear guide ring 43 is provided with a set of through slots (not shown) extending parallel to threads of the female helicoidal thread 43a of the outer linear guide ring 43 so that the set of linear guide followers of the male helicoid ring 32 are engaged in the set of linear guide grooves of the fourth sub-barrel 41 through the set of through slots of the outer linear guide ring 43, respectively.

Accordingly, rotation of the fourth sub-barrel 41 causes the male helicoid ring 32 to rotate about the optical axis O together with the fourth sub-barrel 41 while moving along the optical axis O due to the engagement of the male helicoidal thread 32a with the female helicoidal thread 43a. Consequently, if the fourth sub-barrel 41 moves along the optical axis O while rotating about the optical axis O, the third sub-barrel 31 rotates about the optical axis O together with the fourth sub-barrel 41 while moving along the optical axis O relative to the fourth sub-barrel 41 due to the engagement of the male helicoidal thread 32a with the female helicoidal thread 43a.

[The Structure of the Second Sub-barrel]

The second sub-barrel 21 which serves as a cam ring is provided, on an outer peripheral surface thereof in the vicinity of the rear end of the second sub-barrel 21, with a male helicoidal thread 21a which is in mesh with a female helicoidal thread 33a formed on an inner peripheral surface of the middle linear guide ring 33.

The third sub-barrel 31 is provided on an inner peripheral surface thereof with a set of linear guide grooves (not shown) which extend parallel to the optical axis O, and the second sub-barrel 21 is provided on an outer peripheral surface thereof with a set of linear guide followers (not shown) which are respectively engaged in the set of linear guide grooves of the third sub-barrel 31. The middle linear guide ring 33 is provided with a set of through slots (not shown) extending parallel to threads of the female helicoidal thread 33a of the middle linear guide ring 33 so that the set of linear guide followers of the second sub-barrel 21 are engaged in the set of linear guide grooves of the third sub-barrel 31, respectively.

Accordingly, rotation of the third sub-barrel 31 causes the second sub-barrel 21 to rotate about the optical axis O together with the third sub-barrel 31 due to the engagement of the set of linear guide followers of the second sub-barrel 21 with the set of linear guide grooves of the third sub-barrel 31. Consequently, if the third sub-barrel 31 rotates about the optical axis O, the second sub-barrel 21 moves along the optical axis O relative to the third sub-barrel 31 due to the engagement of the male helicoidal thread 21a with the female helicoidal thread 33a since the second sub-barrel 21 rotates about the optical axis O together with the third sub-barrel 31.

An inner linear guide ring (second ring member) 22 is provided in the second sub-barrel 21. The second sub-barrel 21 and the inner linear guide ring 22 are coupled to each other at the rear ends thereof to be rotatable about the optical axis O relative to each other and to be movable together along the optical axis O. The inner linear guide ring 22 is provided at the rear end thereof with a set of linear guide projections 22e (see FIG. 5) which extend radially outwards, and the middle linear guide ring 33 is provided on an inner peripheral surface thereof with a set of linear guide groves (not shown) which extend parallel to the optical axis O. The set of linear guide projections 22e of the inner linear guide ring 22 are slidably engaged in the set of linear guide groves of the middle linear guide ring 33, respectively, so that the inner linear guide ring 22 is guided linearly in the optical axis direction without rotating about the optical axis O. Accordingly, the inner linear guide ring 22 moves along the optical axis O together with the second sub-barrel 21 while allowing the second sub-barrel 21 to rotate about the optical axis O relative to the inner linear guide ring 22.

[The Structure of the first Sub-barrel]

The first sub-barrel 11 is positioned between the second sub-barrel 21 and the inner linear guide ring 22. The first sub-barrel 11 is provided, on an outer peripheral surface thereof in the vicinity of the rear end of the first sub-barrel 11, with a set of cam followers 11a (only one of them appears in FIG. 1) which extend radially outwards to be engaged in a first set of cam grooves 21b formed on an inner peripheral surface of the second sub-barrel 21, respectively.

The inner linear guide ring 22 is provided on an outer peripheral surface thereof with a set of guide grooves 22d which extend parallel to the optical axis O. The first sub-barrel 11 is provided on an inner peripheral surface thereof with a set of linear guide followers (not shown) which are slidably engaged in the set of guide grooves 22d, respectively, so that the first sub-barrel 11 is movable along the optical axis O without rotating about the optical axis O relative to the inner linear guide ring 22.

Accordingly, rotation of the second sub-barrel 21 causes the first sub-barrel 11 to move along the optical axis O relative to the second sub-barrel 21 and relatively rotates about the optical axis O with respect to the sub-barrel 21 (i.e., the sub-barrel 21 rotates) without rotating about the optical axis O relative to the stationary barrel 51 due to the engagement of the set of cam followers 11a with the first set of cam grooves 21b.

The 4-stage-extension zoom lens 1 is provided at the front end of the first sub-barrel 11 with a lens barrier mechanism 12 which is driven to open and close the barrier blades thereof for protecting the frontmost lens surface from being stained or damaged. The lens barrier mechanism 12 is driven to open and close the barrier blades thereof by forward and rearward movements of the first sub-barrel 11 between the wide-angle position and the retracted position, respectively.

The first sub-barrel 11 supports the first lens group L1 therein behind the lens barrier mechanism 12. The 4-stage-extension zoom lens 1 is provided therein with a lens shutter unit (lens shutter block) 100. The lens shutter unit 100 is fitted in the inner linear guide ring 22 to be movable along the optical axis O without rotating about the optical axis O relative to the inner linear guide ring 22. The second lens group L2 and the third lens group L3 are supported by the lens shutter unit 100 to be positioned inside the lens shutter unit 100 behind the first lens group L1.

The fourth lens group L4 is positioned behind the third lens group L3. The fourth lens group L4 is fixed to the rear end of a rearmost lens group support ring (first ring member) 61 via a lens holder 66 which directly holds the fourth lens group L4.

The rearmost lens group support ring 61 is supported by the inner linear guide ring 22 to be movable along the optical axis O without rotating about the optical axis O relative to the inner linear guide ring 22. A helical compression spring 67 is provided between the lens shutter unit 100 and the rearmost lens group support ring 61 to always bias the third lens group L3 and the fourth lens group L4 in opposite directions away from each other.

Figure 4:
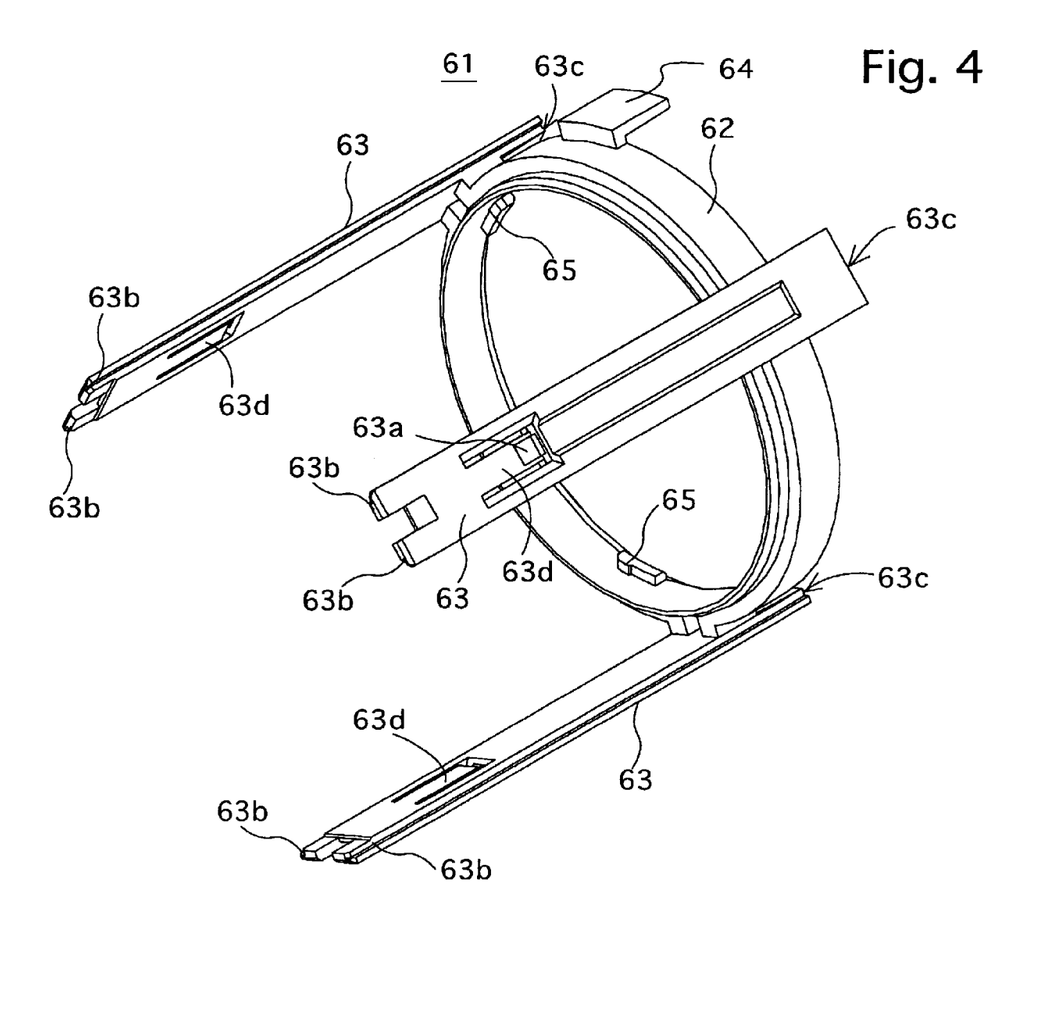
FIG. 4 is a perspective view of a rearmost movable lens group support ring provided in the 4-stage-extension zoom lens shown in FIGS. 1 through 3.
Figure 5:
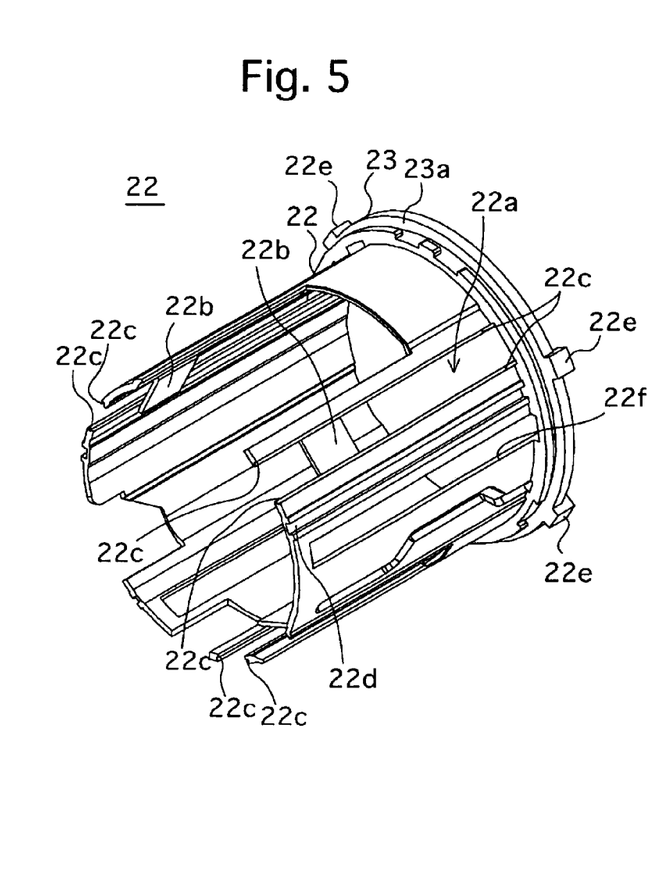
FIG. 5 is a perspective view of an inner linear guide ring provided in the 4-stage-extension zoom lens shown in FIGS. 1 through 3.

The basic structure of the 4-stage-extension zoom lens 1 has been discussed above. Features of the rearmost lens group support ring 61 and the inner linear guide ring 22 will be hereinafter discussed in detail. FIG. 4 is a perspective view of the rearmost lens group support ring 61, and FIG. 5 is a perspective view of the inner linear guide ring 22.

The rearmost lens group support ring 61 is provided with a ring frame portion 62 and three leg portions 63 which extend forward from an outer periphery of the ring frame portion 62 to be parallel to the optical axis O.

Each of the three leg portions 63 is provided, on the free end thereof in the vicinity of the front end of the free end, with a resilient narrow portion 63d (see FIG. 4) which extends substantially parallel to the optical axis O. The front end of each resilient narrow portion 63d is formed integral with the associated leg portion 63 so that the rear end of each resilient narrow portion 63d serves as a free end. Each resilient narrow portion 63d is provided at the rear end thereof with an engaging projection 63a which extends radially outwards. Each of the opposite side edges of each leg portion 63 in a circumferential direction of the ring frame portion 62 is formed as a tongue portion (first support portions) 63b. Namely, the radially outer portions of the opposite side edges of each leg portion 63 project in opposite directions in a circumferential direction of the ring frame portion 62 to be formed as the tongue portions 63b. A rear end face 63c of each leg portion 63 serves as a stopper which comes into contact with the lens stop plate 44 when the power of the camera is turned OFF, i.e., when the first through fourth sub-barrels 11, 21, 31 and 41 are fully retracted into the stationary barrel 51.

The rearmost lens group support ring 61 is provided on an outer peripheral surface of the ring frame portion 62 with a linear guide follower 64 (see FIG. 4). The linear guide follower 64 is slidably engaged in a linear guide groove (not shown) which is formed on an inner peripheral surface of the inner linear guide ring 22 and extends parallel to the optical axis O. Accordingly, the linear guide follower 64 serves as a linear guide member for guiding the rearmost lens group support ring 61 linearly in the optical axis direction without rotating about the optical axis O relative to the inner linear guide ring 22.

The structure of the inner linear guide ring 22, which supports the rearmost lens group support ring 61 so as to move freely along the optical axis O, will be hereinafter discussed. The inner linear guide ring 22 has a substantially cylindrical shape, and is provided at the rear end thereof with a ring frame portion 23. The ring frame portion 23 is provided with a circumferential groove 23a which extends in a circumferential direction about the optical axis O. A set of radial projections 21c formed at the rear end of the second sub-barrel (cam ring) 21 to extend radially inwards are engaged in the circumferential groove 23a of the ring frame portion 23 of the inner linear guide ring 22 so that the second sub-barrel 21 can rotate about the optical axis O relative to the inner linear guide ring 22 and so that the second sub-barrel 21 can move along the optical axis O together with the inner linear guide ring 22.

As shown in FIG. 5, the inner linear guide ring 22 is provided with three slots 22a which extend parallel to the optical axis O, and three bridge portions 22b which partly close the three slots 22a from the inside of the inner linear guide ring 22, respectively. The three leg portions 63 of the rearmost lens group support ring 61 are respectively inserted into the three slots 22a to be movable in the optical axis direction. Each bridge portion 22b is in contact with the associated leg portion 63 over a full width range to prevent the associated leg portion 63 from slipping into the inside of the inner linear guide ring 22 and also to prevent the free end of the associated leg portion 63 from bending inwards, toward the inside of the inner linear guide ring 22. The inner linear guide ring 22 is provided, on respective sides of each slot 22a in a circumferential direction of the inner linear guide ring 22, with half-groove portions (second support portions) 22c which are respectively engaged with the tongue portions 63b of the associated leg portion 63. The half-groove portions 22c formed in each slot 22a are formed to correspond to the tongue portions 63b; namely, radially inner portions of the half-groove portions 22c formed in each slot 22a project in opposite directions in a circumferential direction of the inner linear guide ring 22. Accordingly, each leg portion 63 is prevented from slipping into the inside of the inner linear guide ring 22 in an effective manner due to the engagement of the tongue portions 63b with the half-groove portions 22c.

Figure 6:
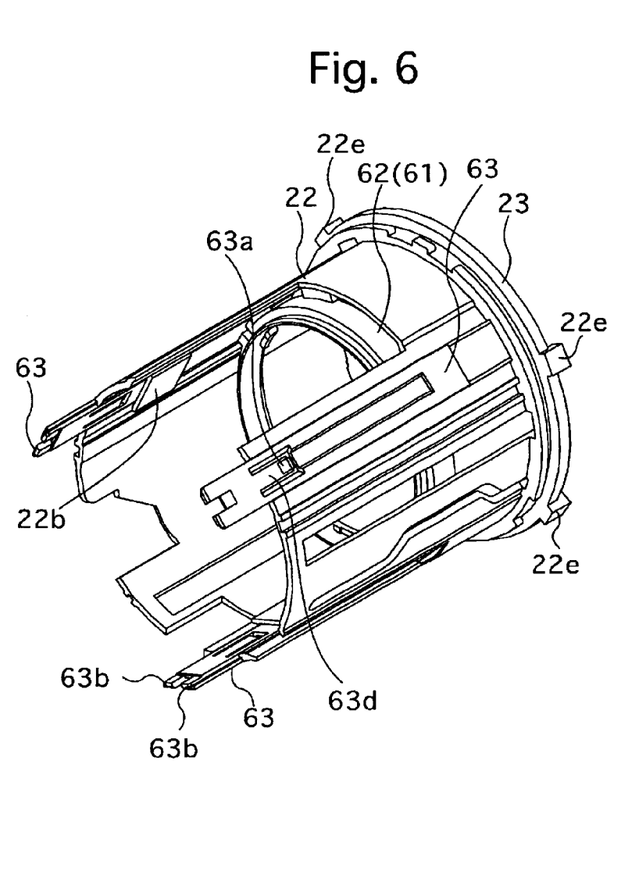
FIG. 6 is a perspective view of the rearmost movable lens group support ring shown in FIG. 4 and the inner linear guide ring shown in FIG. 5 in a state where the rearmost movable lens group support ring and the inner linear guide ring are coupled to each other.

FIG. 6 shows a state where the inner linear guide ring 22 and the rearmost lens group support ring 61 are coupled to each other. In an assembling operation in which the inner linear guide ring 22 and the rearmost lens group support ring 61 are coupled to each other, the rearmost lens group support ring 61 is inserted into the inner linear guide ring 22. At this stage, firstly the three leg portions 63 of the rearmost lens group support ring 61 are respectively inserted into the three slots 22a of the inner linear guide ring 22 from behind the inner linear guide ring 22, which defines the relative angular position between the inner linear guide ring 22 and the rearmost lens group support ring 61 about the optical axis O. An assembly completion state shown in FIG. 6 is obtained when the three leg portions 63 are fully inserted into the three slots 22a, respectively.

Figure 8:
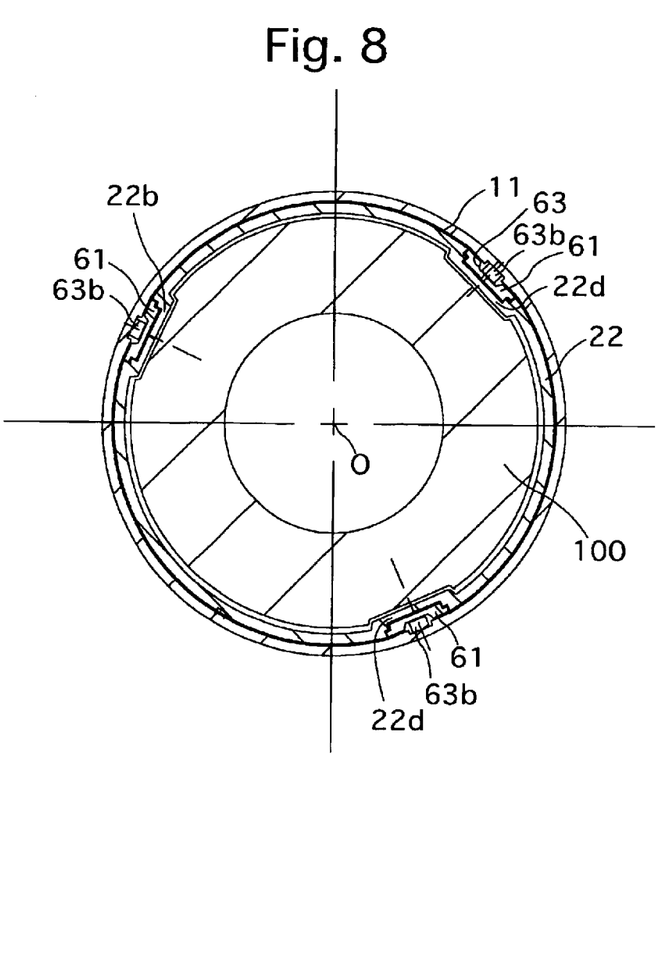
FIG. 8 is a cross sectional view taken along the VIII—VIII line shown in FIG. 1.

The diameter of an imaginary cylinder on which the radially outer surfaces of the three leg portions 63 lie is set to be substantially the same as the diameter of an outer peripheral surface of the inner linear guide ring 22 around the three slots 22a. In other words, as shown in FIG. 8, each leg portion 63 substantially fits within the thickness (in a radial direction) defined in each corresponding slot 22a of the inner linear guide ring 22 with respect to a sectional plane parallel to the optical axis O. Therefore, in a state shown in FIG. 6 where the leg portions 63 are respectively inserted into the three slots 22a, the radially outer surfaces of the leg portions 63 are substantially flush with the outer peripheral surface of the inner linear guide ring 22 that surrounds the three slots 22a so that the outer peripheral surfaces of the inner linear guide ring 22 and the rearmost lens group support ring 61 form a single cylindrical surface. Moreover, in a state shown in FIG. 6 wherein the leg portions 63 are respectively inserted into the three slots 22a, the radially inner surfaces of the leg portions 63 are substantially flush with the inner peripheral surface of the inner linear guide ring 22 that surrounds the three slots 22a so that the inner peripheral surfaces of the inner linear guide ring 22 and the rearmost lens group support ring 61 form a single cylindrical surface. Accordingly, the inner linear guide ring 22 is coupled to the rearmost lens group support ring 61 to be positioned nearly within the radial thickness of the set of leg portions 63. In other words, the rearmost lens group support ring 61 and the inner linear guide ring 22 have substantially the same outward shape.

The rearmost lens group support ring 61 is provided on an inner peripheral surface of the ring frame portion 62 with three engaging projections 65 (only two of which appear in FIG. 4) which radially extend inwards. Before or after the inner linear guide ring 22 and the rearmost lens group support ring 61 are coupled to each other, the lens holder 66 which holds the fourth lens group L4 is inserted into the rearmost lens group support ring 61 from behind (i.e., from the film side/the right side as viewed in FIG. 1) and subsequently the three engaging projections 65 are respectively engaged into three engaging grooves 66a (only one of which appear in FIG. 1) formed on outer peripheral surface of the lens holder 66 to fix the lens holder 66 to the rearmost lens group support ring 61.

The lens shutter unit 100 is inserted into the inner linear guide ring 22 from behind, and subsequently, the rearmost lens group support ring 61 that holds the lens holder 66 and the fourth lens group L4 is inserted into the inner linear guide ring 22 from behind with the helical compression spring 67 held between the lens shutter unit 100 and the rearmost lens group support ring 61. The lens shutter unit 100 is provided on an outer peripheral surface thereof with three linear guide grooves 100a which extend parallel to the optical axis O. The three bridge portions 22b of the inner linear guide ring 22 are respectively positioned in the three linear guide grooves 100a to be freely movable therein in the optical axis direction. The lens shutter unit 100 is provided on an outer peripheral surface thereof with three projections (not shown), while the inner linear guide ring 22 is provided with three slots 22f. The lens shutter unit 100 is supported by the inner linear guide ring 22 with the three projections of the lens shutter unit 100 being respectively engaged in the three slots 22f so that the lens shutter unit 100 is movable along the optical axis O without rotating about the optical axis O relative to the inner linear guide ring 22.

The helical compression spring 67 is positioned between the lens shutter unit 100 and the rearmost lens group support ring 61 (which has the three engaging projections 65) to always bias the lens shutter unit 100 and the rearmost lens group support ring 61 in opposite directions away from each other. Namely, the rearmost lens group support ring 61 is biased rearwards relative to the lens shutter unit 100 (the inner linear guide ring 22). Accordingly, the fourth lens group L4 is always biased by the helical compression spring 67 in a direction away from the third lens group L3.

Figure 7:
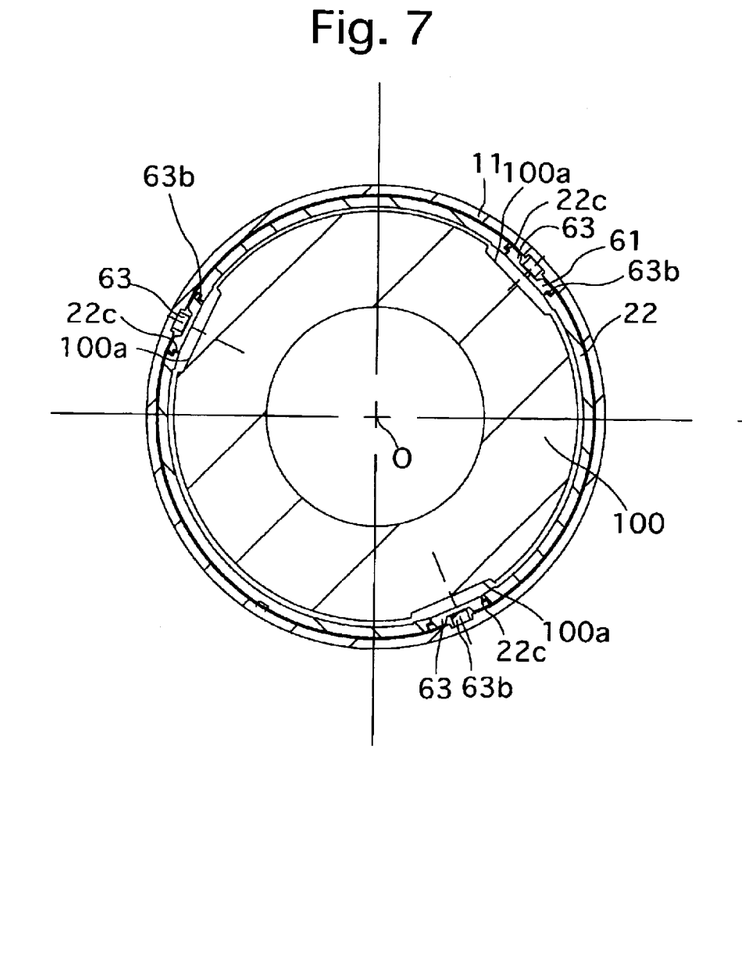
FIG. 7 is a cross sectional view taken along the VII—VII line shown in FIG. 1.

FIG. 7 is a cross sectional view taken along the VII—VII line shown in FIG. 1, showing cross sections of the rearmost lens group support ring 61, the inner linear guide ring 22 and the lens shutter unit 100. FIG. 8 is a cross sectional view taken along VIII—VIII line shown in FIG. 1, showing cross sections of the rearmost lens group support ring 61, the inner linear guide ring 22 and the lens shutter unit 100.

The aforementioned three projections (not shown) of the lens shutter unit 100 are respectively engaged in the three slots 22f of the inner linear guide ring 22 so that the lens shutter unit 100 is movable along the optical axis O without rotating about the optical axis O relative to the inner linear guide ring 22. In addition, three cam followers (not shown) project radially outwards from the aforementioned three projections (not shown) on the lens shutter unit 100 to be engaged in the three slots 22f, respectively. The radially outer ends of the three cam followers are engaged in a second set of cam grooves (not shown) formed on an inner peripheral surface of the second sub-barrel 21, respectively. Therefore, if the second sub-barrel 21, which serves as a cam ring, moves along the optical axis while rotating about the optical axis O, the lens shutter unit 100 moves along the optical axis O without rotating about the optical axis O relative to the inner linear guide ring 22 due to the engagement of the three slots 22f of the inner linear guide ring 22 with the associated cam grooves of the second sub-barrel 21.

Operations of the 4-stage-extension zoom lens 1 will be hereinafter discussed. The 4-stage-extension zoom lens 1 shown in FIG. 1 is in a power-off state, i.e., in a fully retracted state wherein the 4-stage-extension zoom lens 1 is at the shortest length thereof. In this state, the fourth sub-barrel 41 is fully retracted into the stationary barrel 51, the third sub-barrel 31 is fully retracted into the fourth sub-barrel 41, the second sub-barrel 21 is fully retracted into the third sub-barrel 31, and the first sub-barrel 11 is fully retracted into the second sub-barrel 21. In the fully retracted state, the rearmost lens group support ring 61 is biased rearwards by the spring force of the helical compression spring 67 with the rear end surfaces 63c of the three leg portions 63 contacting the lens stop plate 44 so that the rearmost lens group support ring 61 cannot move beyond the lens stop plate 44. Therefore, the 4-stage-extension zoom lens 1 is in a state where the rearmost lens group support ring 61 is positioned at a closest position relative to the first sub-barrel 11, i.e., in a state where the fourth lens group L4 is in a position closest to the third lens group L3.

The reference letter "D" shown in FIG. 1 represents the distance between the point on the front surface of the first lens group L1 and the point on the rear surface of the fourth lens group L4 at the optical axis O in the fully retracted state.

Immediately after the power of the camera is turned ON, the zoom motor rotates in a forward direction. Forward rotation of the zoom motor causes the fourth sub-barrel 41, the third sub-barrel 31 and the second sub-barrel 21 to advance while rotating relative to the stationary barrel 51, the fourth sub-barrel 41 and the third sub-barrel 31, respectively. At the same time, the first sub-barrel 11 advances without rotating relative to the second sub-barrel 21. Consequently, the 4-stage-extension zoom lens 1 is positioned at the wide-angle extremity position as shown in FIG. 2.

When the first through fourth sub-barrels 11, 21, 31 and 41 are driven, since the rearmost lens group support ring 61 moves forward in the optical axis direction together with the fourth sub-barrel 41, the rear end surfaces 63c of the three leg portions 63 is disengaged from the lens stop plate 44. At the same time, the lens shutter unit 100 moves forward relative to the rearmost lens group support ring 61 by the spring force of the helical compression spring 67 so that the third lens group L3 moves away from the fourth lens group L4.

When the 4-stage-extension zoom lens 1 is in the wide-angle extremity position, the engaging projections 63a of the resilient narrow portions 63d of the rearmost lens group support ring 61 are respectively in contact with three projections 11b (only one of them appears in each of FIGS. 1 through 3) which project radially inwards from an inner peripheral surface of the first sub-barrel 11 at the rear end thereof to prevent further forward movement of the first sub-barrel 11 relative to the rearmost lens group support ring 61. At this stage, a distance "D" (shown in FIG. 2) between the point on the front surface of the first lens group L1 and the point on the rear surface of the fourth lens group L4 on the optical axis O is greater than the distance "D" shown in FIG. 1. The distance "D" is maintained in the zooming range, i.e., in a focal length range between the wide-angle extremity shown in FIG. 2 and the telephoto extremity shown in FIG. 3.

Immediately after the power of the camera is turned OFF, the zoom motor rotates in a reverse direction. Reverse rotation of the zoom motor causes the fourth sub-barrel 41, the third sub-barrel 31 and the second sub-barrel 21 to retreat while rotating relative to the stationary barrel 51, the fourth sub-barrel 41 and the third sub-barrel 31, respectively. At the same time, the first sub-barrel 11 retreats without rotating relative to the second sub-barrel 21. Subsequently, the 4-stage-extension zoom lens 1 is fully retracted as shown in FIG. 1 via the wide-angle extremity position shown in FIG. 2.

During the retracting motion of the 4-stage-extension zoom lens 1 beyond the wide-angle extremity position of FIG. 2, the rear end surfaces 63c of the three leg portions 63 come into contact with the lens stop plate 44 so that the rearmost lens group support ring 61 cannot move beyond the lens stop plate 44, and subsequently, the rearmost lens group support ring 61 moves back together with the fourth sub-barrel 41. At this stage, the first lens group L1 approaches the fourth lens group L4 since the inner linear guide ring 22 moves backward relative to the rearmost lens group support ring 61 while the half-groove portions 22c of the inner linear guide ring 22 and the tongue portions 63b of the rearmost lens group support ring 61 slide along each another. Finally, the 4-stage-extension zoom lens 1 is fully retracted as shown in FIG. 1.

As can be understood from the above description, in the present embodiment of the 4-stage-extension zoom lens, a 4-stage-extension zoom lens having a smaller diameter can be achieved since a member which supports the rearmost lens group (fourth lens group L4) is formed as the rearmost lens group support ring 61 having the leg portions 63, and since the inner linear guide ring 22 and the rearmost lens group support ring 61 have substantially the same diameter due to the structure wherein the leg portions 63 are respectively fitted in the slots 22a of the inner linear guide ring 22. It should be noted that the structure of the rearmost lens group support ring 61 having the leg portions 63 and the slots 22a of the inner linear guide ring 22 can be applied to not only to the present embodiment of the 4-stage-extension zoom lens 1 but also to a different lens barrels structure having a different lens design.

It should be noted that the number of the leg portions 63 and also the number of the slots 22a are not limited to three but can be any other number in theory.

As can be understood from the above description, a weight reduction of a zoom lens can be achieved due to the structure in which a member which supports the rearmost lens group is formed as a set of leg portions extending parallel to the optical axis from a ring member. In addition, a zoom lens can be further miniaturized due to the structure in which the set of leg portions are supported by a cylindrical member via a corresponding set of slots formed thereon which extend parallel to the optical axis, wherein each leg portion substantially fits within the thickness (in a radial direction) defined in each corresponding slot of the cylindrical member with respect to a sectional plane parallel to the optical axis O.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
    a first ring member having a ring frame portion and at least one leg portion which extends from said ring frame portion in an optical axis direction; and
    a second ring member, which is relatively movable in said optical axis direction with respect to said first ring member, said second ring member having at least one slot which extends in said optical axis direction, said leg portion being inserted into said slot so that said leg portion can move in said optical axis direction along said slot;
    wherein said second ring member is coupled to said first ring member so that said second ring member is positioned substantially within a radial thickness of said leg portion; and
    wherein a rearmost end toward an image side of the lens barrel of said first ring member is configured to be movable along the optical axis to positions forward and rearward of a rearmost end toward an image side of the lens barrel of said second ring member.

2. The lens barrel according to claim 1, wherein a radially outer surface of said leg portion is substantially flush with an outer peripheral surface of said second ring member.

3. The lens barrel according to claim 1, wherein a radially inner surface of said leg portion is substantially flush with an inner peripheral surface of said second ring member.

4. A zoom lens having a frontmost movable lens group, at least one intermediate movable lens group and a rearmost movable lens group, in that order from the front of said zoom lens, said zoom lens comprising:
    a lens support ring which supports said frontmost movable lens group;
    a linear guide ring positioned in said lens support ring to be movable along said optical axis; and
    a rearmost lens group support ring which supports said rearmost movable lens group, said rearmost lens group support ring being positioned in said lens support ring to move along said optical axis while varying a distance between said rearmost movable lens group and said frontmost movable lens group;
    wherein said rearmost lens group support ring comprises at least one leg portion which extends parallel to said optical axis;
    wherein said linear guide ring includes at least one slot which extends parallel to said optical axis, said leg portion being inserted into said slot so that said leg portion can move in said optical axis direction along said slot; and
    wherein said leg portion fits in said slot of said linear guide ring so that an outer surface of said leg portion is flush with an outer peripheral surface of said linear guide ring.

5. The zoom lens according to claim 4, wherein said leg portion comprises an engaging portion which comes into contact with said lens support ring to prevent said lens support ring from moving along said optical axis relative to said rearmost lens group support ring to thereby maintain said distance between said frontmost movable lens group and said rearmost movable lens group.

6. The zoom lens according to claim 5, wherein said leg portion comprises a resilient narrow portion extending parallel to said optical axis, a front end of said resilient narrow portion being formed integral with said leg portion so that a rear end of said resilient narrow portion serves as a free end; and wherein said engaging portion is formed at said rear end of said resilient narrow portion and extends radially outwards.

7. The zoom lens according to claim 4, wherein a portion of said linear guide ring on which said slot is formed is positioned in said lens support ring; and wherein said leg portion is inserted into said slot to be slidable in said optical axis direction so that said rearmost movable lens group is movable in said optical axis direction without rotating about said optical axis relative to said linear guide ring.

8. The zoom lens according to claim 7, wherein said linear guide ring comprises at least one bridge portion which extends under a portion of said slot from inside of said linear guide ring; and wherein said bridge portion is in contact with said leg portion over a full width range thereof to prevent said leg portion from slipping into the inside of said linear guide ring.

9. The zoom lens according to claim 7, wherein said leg portion comprises first support portions formed on opposite side edges of said leg portion, respectively; and wherein said linear guide ring comprises second support portions formed on respective sides of said slot, wherein said first support portions are in sliding contact with said second support portions so as to prevent said leg portion from slipping into the inside of said linear guide ring.

10. The zoom lens according to claim 9, wherein each of said first support portions comprises a tongue portion, and wherein each of said second support portion comprises a half groove portion on which said tongue portions is slidably positioned.

11. The zoom lens according to claim 4, wherein said zoom lens comprises a multi-stage-extension zoom lens barrel having a plurality of sub-barrels arranged concentrically about said optical axis, said distance between said frontmost movable lens group and said rearmost movable lens group being reduced when said plurality of sub-barrels are fully retracted.

12. The zoom lens according to claim 4, further comprising a lens shutter unit positioned between said frontmost movable lens group and said rearmost movable lens group and around said intermediate movable lens group.

13. A zoom lens having a frontmost movable lens group, at least one intermediate movable lens group and a rearmost movable lens group, in that order from the front of said zoom lens, said zoom lens comprising:

a lens support ring which supports said frontmost movable lens group;

a linear guide ring positioned in said lens support ring to be movable along said optical axis; and a rearmost lens group support ring which supports said rearmost movable lens group, said rearmost lens group, support ring being positioned in said lens support ring to move along said optical axis while varying a distance between said rearmost movable lens group and said frontmost movable lens group;

wherein said rearmost lens group support ring comprises at least one leg portion which extends parallel to said optical axis;

wherein said linear guide ring includes at least one slot which extends parallel to said optical axis, said leg portion being inserted into said slot so that said leg portion can move in said optical axis direction along said slot; and wherein a distance, in a radial direction, from the optical axis to an outer surface of said leg portion that is fitted in said slot of said linear guide ring is identical to a distance, in a radial direction, from the optical axis to an outer peripheral surface of said linear guide ring.

* * * * *